Figure 1:
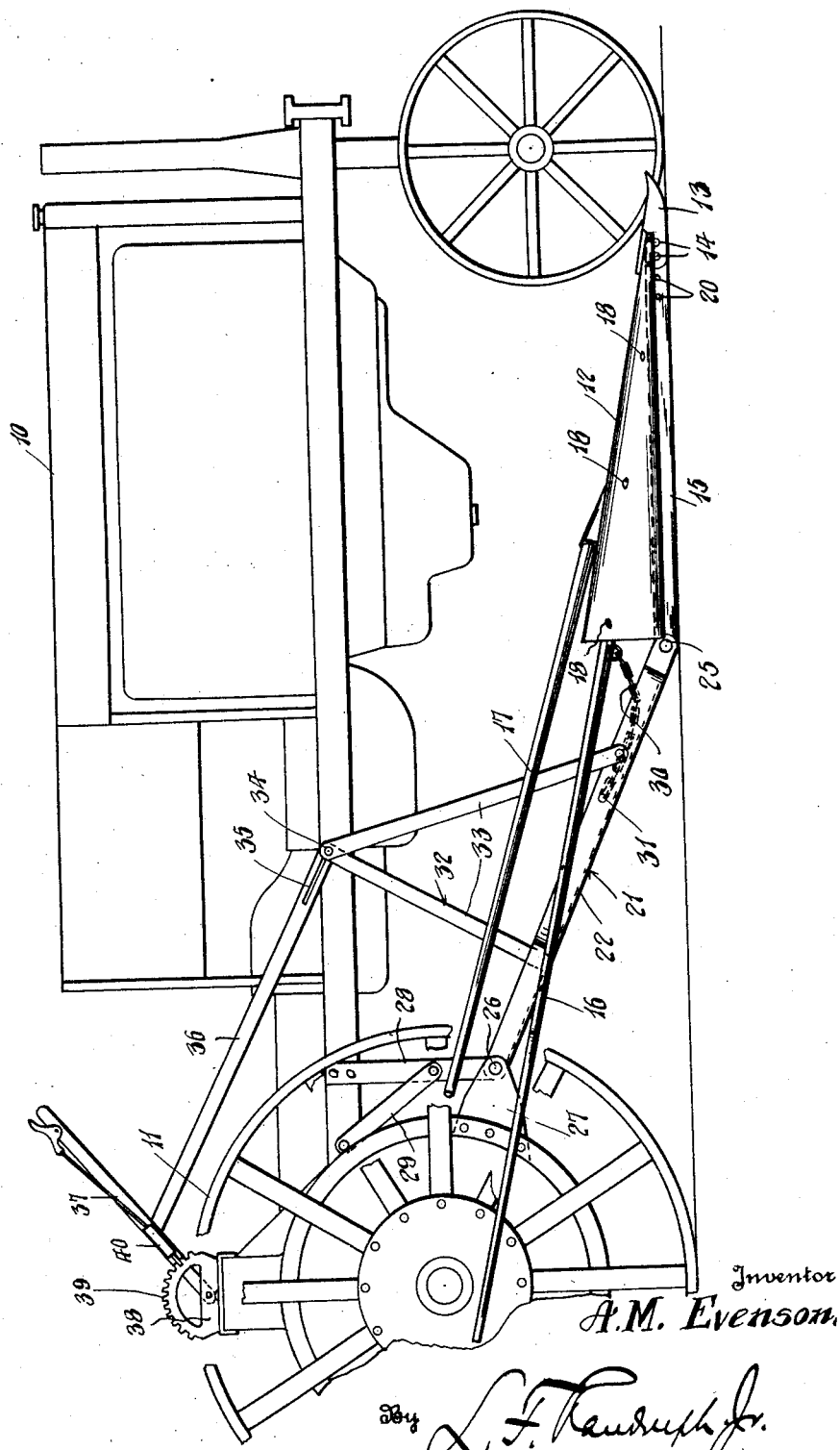

March 7, 1933. A. M. EVENSON 1,900,806
CORN REMOVING ATTACHMENT
Filed Nov. 17, 1931 2 Sheets-Sheet 1

Inventor
A. M. Evenson,
By L. F. Randolph Jr.
Attorney

March 7, 1933.   A. M. EVENSON   1,900,806
CORN REMOVING ATTACHMENT
Filed Nov. 17, 1931   2 Sheets-Sheet 2
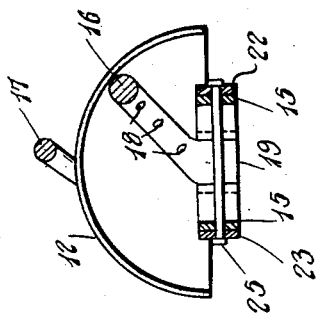
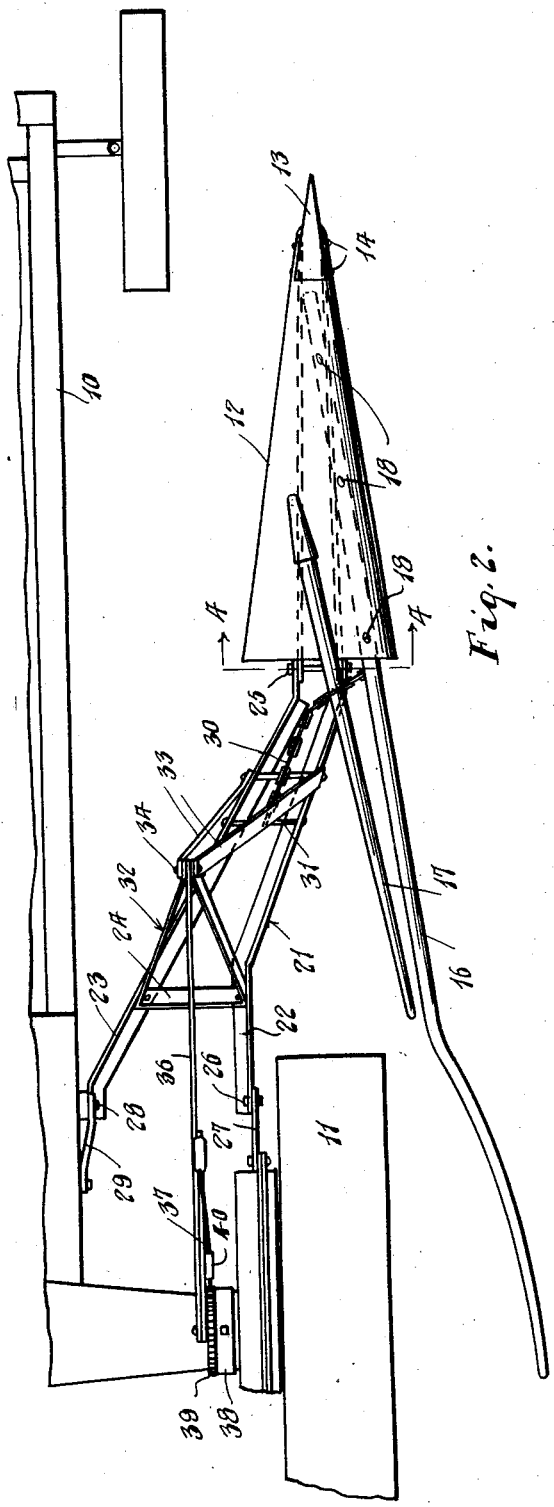
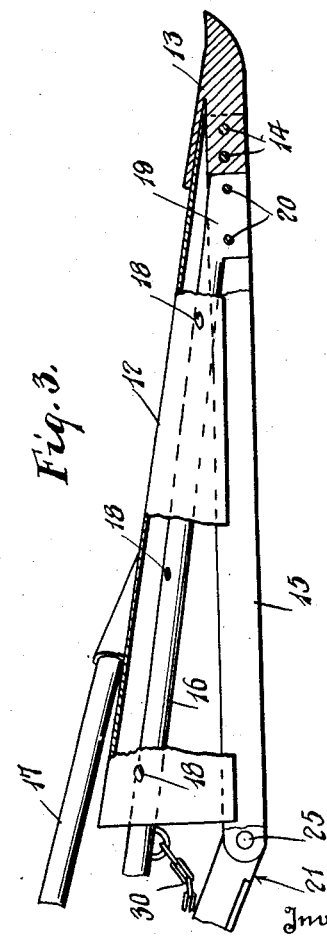
Inventor
A. M. Evenson.
By L. F. [signature]
Attorney Patented Mar. 7, 1933

1,900,806

UNITED STATES PATENT OFFICE

ARTHUR M. EVENSON, OF SPRING GROVE, MINNESOTA

CORN REMOVING ATTACHMENT

Application filed November 17, 1931. Serial No. 575,623.

This invention relates to an attachment for tractors and it aims to provide a means whereby listed or lodged standing corn stalks, in the path of advance of a rear wheel of the tractor, will be removed from such path so that the same may be saved and not crushed or mutilated. The attachment is particularly adapted for use in line with that rear wheel of the tractor which runs next to the row of corn or the like which is being cut or picked.

It is particularly aimed to provide a novel construction which may be readily raised or lowered out of or into use, which is adapted to travel on the ground and have limited yielding movement when encountering obstructions.

The more specific objects and advantages will become apparent from a consideration of the description following taken in connection with accompanying drawings illustrating an operative embodiment.

In said drawings:—

Figure 1 is a view in side elevation of a tractor equipped with my improvements, Figure 2 is a plan view showing the improvements applied to a part of the tractor, Figure 3 is a central vertical longitudinal sectional view through the clearing head, and Figure 4 is a cross sectional view taken on the line 4—4 of Figure 2.

Referring specifically to the drawings, 10 generally designates a tractor of conventional form and usually of the all purpose type. In the practice of my invention, usually corn or the equivalent is being cut or picked and that rear wheel of the tractor which runs next to the row being cut or picked is shown at 11.

According to the invention, a corn stalk removing member is employed at 12 in front of and alined with the said wheel 11, the member comprising a hollow body of semi-conical shape which has a runner 13 at its forward end, adapted to travel on the ground, riveted thereto as at 14. Also secured in place by the rivets or other fastenings 14, is a pair of spaced bars 15 which also serve as runners and travel on the ground. Divider sticks 16 for the corn, extend from the remover 12, the former being riveted thereto as at 18 and having an enlargement at 19 through which rivets or bolts 20 pass, also passing through the bars 15.

A rigid frame 21, consisting of side bars 22 and 23, connected by cross members 24, is pivotally connected by means of a bolt 25, to the rear end of the bars 15. The rear end of the bar 22, is pivoted as at 26 to a suitable bracket 27 fastened to a part of the tractor. The other bar 23 in line with the bolt 26, is pivoted at 28 to another bracket 29 fastened to a suitable part of the tractor. A flexible chain or other element 30 is connected to the stick 16 and to a part 31 of the frame 21, so as to prevent the head 12 from falling or unduly moving downwardly on its pivot 25, when elevated above the ground.

Suitably built up on the frame 21 is a super structure 32 consisting of diagonally arranged bars 33 fastened to the frame 21 and all connected together by a bolt 34. Bolt 34 passes through an elongated slot 35 of a pitman 36 which is connected to a lever 37 pivoted to a bracket 38 fastened to the tractor, and which bracket includes a toothed segment 39 engageable by a locking device 40 on the lever 37.

Normally the device is in operative position as shown in Figure 1, with the head 12 traveling in advance of the wheel 11 so as to clear the path of corn stalks or the like. The slot 35 permits a limited vertical movement of the head 12 due to obstructions in the path of travel. When desired, the lever 37 may be moved in the reverse position of Figure 1. to the left, in order to elevate the head and associated parts above the ground, as when traveling to and from the field.

Various changes may be resorted to provided they fall within the spirit and scope of the invention.

I claim as my invention:—

1. In combination with a farm vehicle having a wheel adapted to travel adjacent a row of corn, a removing head for listed or lodged corn stalks disposed forwardly of the wheel and in its path of travel, comprising a body horizontally arranged and substantially semi-conical with its smaller end foremost, runner means on the body engageable with the ground, a frame pivotally connected to said body and pivoted to the vehicle, and means to move the body into and out of operative position.

2. In combination with a farm vehicle having a wheel adapted to travel adjacent a row of corn, a removing head for listed or lodged corn stalks disposed forwardly of the wheel and in its path of travel, comprising a body horizontally arranged and substantially semi-conical with its smaller end foremost, runner means on the body engageable with the ground, a frame pivoted to the vehicle and pivotally connected to said body, operating means on the vehicle, a pitman extending from said means to the frame, and a slip connection between the frame and said pitman to enable the body to yield when encountering obstructions.

3. A harvester attachment, comprising a removing body, runners carrying said body, a frame attachable to a tractor, said runners being pivoted to said frame, divider stick means extending from the body, a flexible connection between the body and the frame to limit the movement of the body relatively to the frame when elevated above the ground, and means attachable to a vehicle and operable to elevate and lower said frame, said means having slip connection with the frame permitting voluntary movement thereof relatively to the means.

4. A harvester attachment, comprising a removing body, runners carrying said body, a frame attachable to a tractor, said runners being pivoted to said frame, divider stick means extending from the body, a flexible connection between the body and the frame to limit the movement of the body relatively to the frame when elevated above the ground, means attachable to a vehicle and operable to elevate and lower said frame, said means having slip connection with the frame permitting voluntary movement thereof relatively to the means and said frame having its forward end outwardly offset with respect to its rear end.

In testimony whereof I affix my signature.

ARTHUR M. EVENSON.